J. L. HINDS.
COUPLING FOR ELECTRIC CONDUCTORS.
APPLICATION FILED APR. 1, 1909.
939,689.
Patented Nov. 9, 1909.
Fig-1-
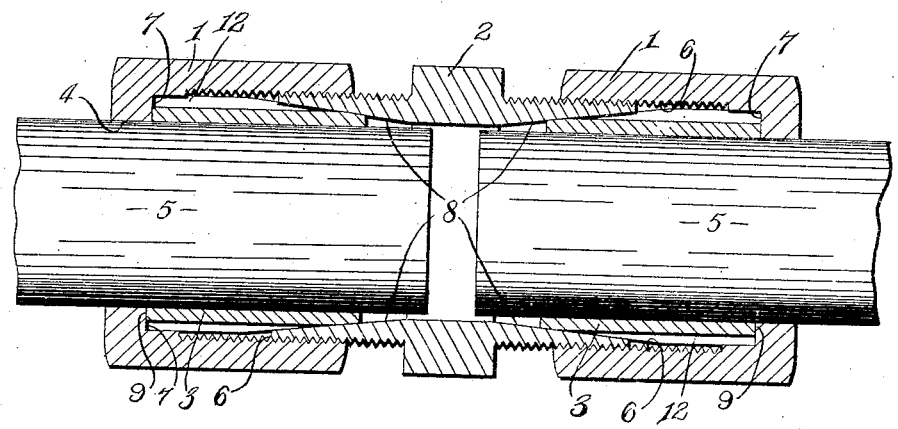
Fig-2-
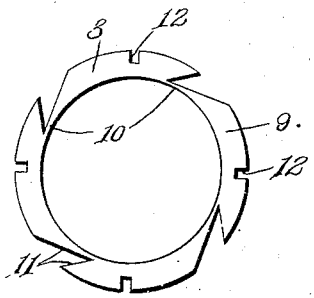
Fig-3-
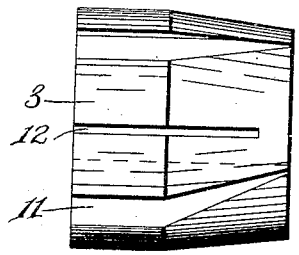
WITNESSES:
INVENTOR
BY
ATTORNEYS

UNITED STATES PATENT OFFICE.

JESSE L. HINDS, OF SYRACUSE, NEW YORK, ASSIGNOR TO CROUSE-HINDS COMPANY, OF SYRACUSE, NEW YORK, A CORPORATION OF NEW YORK.

COUPLING FOR ELECTRIC CONDUCTORS.

939,689.  Specification of Letters Patent.  Patented Nov. 9, 1909.

Application filed April 1, 1909. Serial No. 487,125.

*To all whom it may concern:*

Be it known that I, JESSE L. HINDS, of Syracuse, in the county of Onondaga and State of New York, have invented a certain new and useful Coupling for Electric Conductors, of which the following is a specification.

My invention has for its object the production of a particularly simple and efficient coupling for electric conductors, and it consists in the combinations and constructions hereinafter set forth and claimed.

In describing this invention, reference is had to the accompanying drawing in which like characters designate corresponding parts in all the views.

Figure 1 is a longitudinal section of one form of my coupling, contiguous ends of conductors or cables connected thereby being also shown. Figs. 2 and 3 are, respectively, end and side elevations of one of the sleeves.

This coupling comprises, generally, an outer section 1, an inner section 2, and a sleeve 3 in said sections. In the illustrated form of my invention, I have shown two outer sections 1 receiving opposite ends of the inner section, but it is obvious that one of said outer sections may be dispensed with, if desired. The outer section 1 is formed with a passage 4 for the naked end of a conductor 5, a threaded passage 6 alined with the passage 4 and of greater diameter than the same, and an annular shoulder 7 arranged at the inner end of the threaded passage at a right angle to the axis of the section 1. The inner section 2 is externally threaded and turns into the threaded passage 6 of the outer section, and is formed with a conical bore 8, having its larger end arranged toward the shoulder 7 of the outer section. As illustrated, when the coupling is provided with two outer sections, one at each end, both ends of the inner section are threaded and provided with conical bores, but if one of the outer sections is dispensed with one end of the inner section may be otherwise formed.

One end of the sleeve 3 is provided with a shoulder or face 9 disposed at a right angle to the axis of the outer section and engaging the annular shoulder 7 of the outer section, and its other end is tapered and projects into the conical bore of the inner section. The inner face of the sleeve is continuous, and as seen in Fig. 2, the sleeve is provided with thin flexible portions 10 rendering the sleeve contractile. As illustrated, the sleeve is provided with said flexible portions by forming in its periphery a plurality of lengthwise grooves 11, located equal distances from each other, these grooves being substantially V-shaped in cross-section and having their opposing walls inclining in the same general direction, one wall of each groove being disposed substantially tangential to the bore of the sleeve adjacent to the opposite wall of the groove. By forming the walls of the grooves 11 as described, each groove is provided at one side thereof with a wall decreasing in thickness toward the juncture of the walls of the groove and terminating in a thin, flexible lengthwise portion 10 which buckles inwardly as the sleeve is compressed and permits the contiguous portion of said wall to move relatively to the opposite wall of the groove in a direction substantially tangential to the bore of the sleeve. Preferably, the sleeve is also provided with lengthwise peripheral grooves 12 alternating with the grooves 11 for facilitating the compressing or contracting of the sleeve upon the conductor. The sleeve 3 may, however, be provided with only one of the flexible portions 10, or if desired, said sleeve may be provided with a plurality of said portions 10 located unequal distances from each other. Moreover, the sleeve 3 may be unprovided with the grooves 12 or may be provided with but one of said grooves.

In operation, the naked end of a conductor or cable 5 is inserted through the outer section into the sleeve 3, and as the sections 1 and 2 are drawn toward each other by turning either one or the other, the annular shoulder 7 of the outer section 1 engages the shoulder or face 9 of the sleeve 3, forcing said sleeve into the conical bore of the inner section 2 and thereby compressing the sleeve upon the conductor. In the compression of the sleeve 3, the thin portions 10 buckle or yield, and the contiguous portions of the walls of the grooves 11 provided with said portions 10 move relatively to the opposite walls of the grooves in a direction substantially tangential to the bore of the sleeve, thus adapting the sleeve for use on electric conductors of different diameters. It will be particularly noted that as the inner face of the sleeve 3 is continuous there is no liability of any portion or strand of the conductor being caught between separated parts of the sleeve, as would be the case were the inner face of the sleeve slotted.

As will be obvious to those skilled in the art, the construction and arrangement of the shoulder 9 and the tapered end of the sleeve 3 and the coacting parts of the sections 1 and 2 effect a particularly powerful compression of the sleeve and a highly efficient electrical contact between the sleeve and the inner section without producing any strain tending to separate the engaging surfaces of the outer and inner sections of the coupling, as would be the case were the passage 4 conical and both ends of the sleeve 3 tapered.

What I claim is:—

A coupling for electric conductors comprising a compressible sleeve and means for compressing the same, the sleeve having a smooth unbroken bore for receiving a conductor and making electrical contact therewith throughout substantially the extent of said bore, said sleeve having a lengthwise groove in its periphery, the opposing walls of the groove inclining in the same general direction, and one of such walls being disposed substantially tangential to the bore of the sleeve adjacent to the opposite wall of the groove, whereby the groove is provided at one side thereof with a wall decreasing in thickness toward the juncture of said opposing walls and terminating in a thin, flexible, lengthwise portion which buckles inwardly as the sleeve is compressed and permits the contiguous portion of said wall to move relatively to the opposite wall of the groove in a direction substantially tangential to the bore of the sleeve, thus avoiding injury to the conductor and adapting the sleeve for use on electric conductors of different diameters.

In testimony whereof, I have hereunto signed my name in the presence of two attesting witnesses, at Syracuse, in the county of Onondaga, in the State of New York, this 29th day of March, 1909.

JESSE L. HINDS.

Witnesses:
 S. DAVIS,
 FREDERIC G. BODELL.